UNITED STATES PATENT OFFICE.

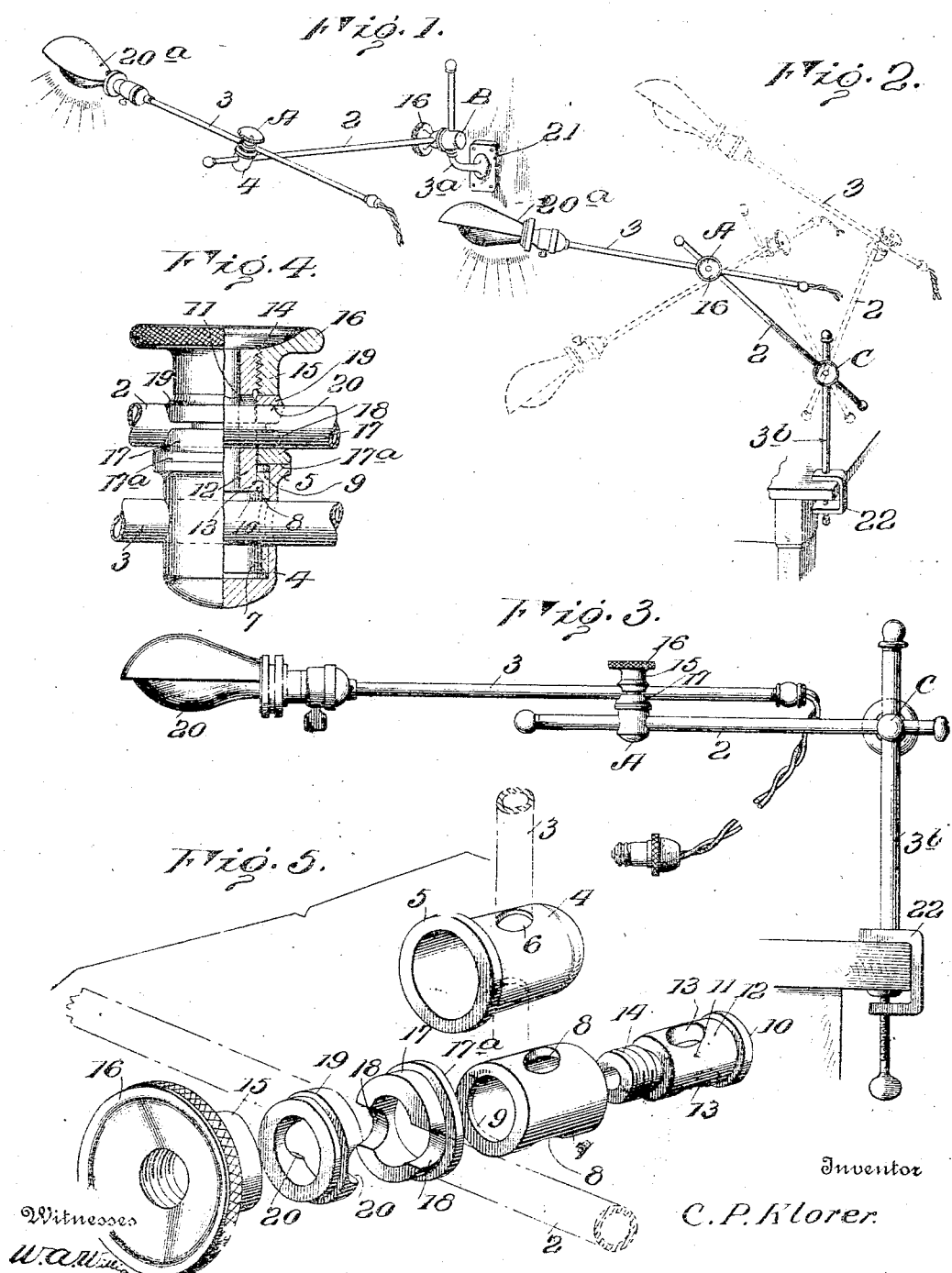

CHARLES P. KLORER, OF EAST CONEMAUGH, PENNSYLVANIA, ASSIGNOR OF TWO-THIRDS TO JOSEPH E. ZANG, OF JOHNSTOWN, PENNSYLVANIA.

FLEXIBLE CLAMP-JOINT.

1,137,333.

Specification of Letters Patent.  Patented Apr. 27, 1915.

Application filed March 9, 1914. Serial No. 823,515.

*To all whom it may concern:*

Be it known that I, CHARLES P. KLORER, citizen of the United States, residing at East Conemaugh, in the county of Cambria and State of Pennsylvania, have invented certain new and useful Improvements in Flexible Clamp-Joints, of which the following is a specification.

My invention relates to adjustable joint connections, and particularly to clamp joints whereby two elements such as two rods may be sustained in any desired longitudinally adjustable and angularly adjusted position relative to each other.

The main object of my invention is to provide a very simple and effective form of clamp connection between two elements, the planes of which intersect, so that the elements may be readily shifted longitudinally relative to each other and as readily clamped so firmly in their adjusted positions that they can not be accidentally shifted therefrom.

A further object of the invention is to provide a clamp joint having means for clamping two elements in their longitudinally adjusted position, so constructed as to permit the elements to be rotated relative to each other so as to secure any desired angular adjustment of the elements without, however, releasing any of the pressure of the clamp, and without in any way affecting the clamping action.

A further object of the invention is to provide a construction in which two elements may be moved to any desired position vertically or horizontally by a slight push or pull, and so formed that the elements will remain in their position until moved again.

A further object of the invention is to provide a construction of this character in which the elements may be moved forward or backward to shorten or lengthen them relative to the pivotal center of the elements by slightly releasing the clamping pressure.

A further object of the invention is to provide a clamping joint in which the gripping or clamping power of a screw is used to simultaneously clamp both elements supported by the clamping joint, the device being so formed that the slackening or tightening up of this one screw will act to release both elements to permit of their longitudinal adjustment or will tighten up both elements.

Still another object is to provide a joint of this character in which two smooth confronting bearing members are provided to which the two elements are clamped, these bearing members being rotated into frictional engagement with each other by the action of the clamp but being always in rotative engagement with each other so that the two elements may be independently shifted with a minimum of effort.

Other objects will appear in the course of the following description.

My invention is illustrated in the accompanying drawings wherein:

Figure 1 is a perspective view of an electric light supporting bracket showing the adaptation of my joint for this purpose. Fig. 2 is a perspective view showing another form of supporting bracket and showing in dotted lines various positions of the arms or rods of said bracket relative to the supporting standard and to each other. Fig. 3 is a side elevation of the form of bracket shown in Fig. 2. Fig. 4 is a view half in section and half in elevation of the clamping joint whereby two rods may be supported rotatively with relation to each other and clamped against longitudinal movement or accidental rotation. Fig. 5 is a perspective view of the various members of the joint separated from each other.

Corresponding and like parts are referred to in the following description and indicated in all the views of the accompanying drawings by the same reference characters.

While I have shown in Figs. 1, 2 and 3 this flexible clamping joint as being applied to a bracket supporting an electric light, it is to be understood that this is purely for illustrative purposes and that the clamping joint is designed by me to be used in a large variety of other situations and is not limited in any way to the application illustrated in Figs. 1, 2 and 3. In view of this, it is best to first describe the joint itself and later describe its application to the brackets shown in Figs. 1, 2 and 3.

Referring therefore to Figs. 4 and 5, 2 designates one rod or like supported element and 3 another like rod. The joint whereby these rods are supported comprises an outer thimble or member 4 which as illustrated is closed at one end for the purpose of preventing dust from accumulating within the joint. It is formed at the other end with a relatively wide head 5 and is also formed with diametrically disposed perforations 6 or apertures for the transverse passage of the rod 3.

Disposed within the thimble clamping member 4 and snugly fitting therein, is a hollow member 7 which has longitudinal movement with relation to the member 4. This member 7 is formed at diametrically opposite points with the circular apertures 8 as shown best in Fig. 5 through which the rod 3 passes. The end of the member 7 adjacent the head 5 is formed with an inwardly projecting annular flange 9.

Engaging with the inwardly projecting flange 9 of the member 7 is the enlarged head 10 of a bolt 11. This bolt is shown as tubular in order that the weight of the bolt shall be reduced, but it might be solid. The bolt is provided with a smooth faced portion 12 and is transversely apertured as at 13 for the passage of the element 2, this aperture 13 being elliptical in form for a purpose to be later stated. One end of the bolt 11 opposite the head 10 is reduced as at 14 and screw threaded for engagement with an annular clamping nut 15 interiorly screw threaded and provided with an enlarged head 16 knurled upon its periphery so as to make it easy to turn.

Disposed upon the portion 12 of the bolt is an annular clamping member 17 having a flat end face 17$^a$ bearing against the flat face of the head 5 of the member 4 and rotatable smoothly thereon. The wall of the clamping member 17 is cut away at diametrically opposite points to form semicircular seats 18 for the reception of the rod or element 2. Also disposed upon the smooth portion 12 of the bolt 11 is the coacting clamping member 19 having practically the same form as the member 17 and having its wall cut away at diametrically opposite points as at 20 to form semicircular seats coacting with the seats 18 and adapted to fit over the rod 2. The inner end of the nut 15 bears against the outer end face of this clamping member 19.

With the parts considered as described, it will be seen that when the nut 15 is turned up, the bolt 11 is drawn longitudinally relative to the clamping member 4 and that this will cause a longitudinal movement of the clamping member 7 relative to the clamping member 4 which will carry the perforations 8 out of concentricity with the perforations 6 and that as a consequence the clamping member 7 will bite upon the rod 3 and the two clamping members 4 and 7 will be placed in clamping engagement with the rod 3. The rotation of the nut 15 will also draw the bolt 11 longitudinally with relation to the clamping members 17 and 19, which is permitted by the slot or elongated aperture in the bolt 11, and simultaneously the clamping member 19 will be forced toward the clamping member 17, thus securely clamping the rod 2 between the clamping members 17 and 19. Inasmuch as the bolt 11 has swiveled engagement with one pair of clamping members, that is, the clamping members 4 and 7 through the engagement of the head 10 of the bolt with the flange 9, it will be obvious that the bolt, the nut and the clamping members 17 and 19 may be rotated relative to the clamping members 4 and 7 without in any way disturbing the position of the nut 15 and without in any way acting to rotate the nut 15 in a reverse direction which would cause the unscrewing of the nut. It will be seen that viewed in this light, the clamping members 17 and 19 act as washers between the nut 15 and the head 5 of member 4. While the smooth contacting faces of the end of clamping member 17 and the head 5 of clamping member 4 permit these members to rotate smoothly against each other, yet it will be understood that a tightening up of the nut 15 will force the clamping member 17 against the head 5 and thus increase the frictional engagement between the clamping members so as to resist any accidental rotative movement of the clamping member 17 with relation to the clamping member 5.

The rods 2 and 3 it will be obvious when the nut 15 is reversely turned are longitudinally shiftable through the apertures or seats in the clamping members, and these rods 2 and 3 may also be rotated around their longitudinal axes. By my improved joint, therefore, I secure the ability to adjust the rods 2 and 3 longitudinally with relation to the joint and with relation to each other to any desired position and also permit the rotation of these rods around their own axes and also hold the rods in any angular relation to each other and yet permit said rods to be readily rotated with relation to each other to carry the rods into any desired angular relation. A slight pressure exerted in turning the thumb nut effectually clamps the one rod between the clamping members 17 and 19, and it also effectually clamps the other rod or element by setting up a shearing pressure caused by the pull upon the clamping thimble and the eccentric relation thus caused between one of the cylindrical clamping members 4 and the other clamping member 7. It also exerts enough pressure between one of the annular clamping members 17 and the end of the clamping thimble or outer member 4 to produce all the friction necessary to the proper working of the joint.

In this device there is provided an effectual application of a mechanically perfect vise structure with the added advantages of thorough flexibility or adjustability in that either of the elements 2 or 3 can be turned in any horizontal direction with reference to the other element without releasing any of the pressure of the clamp, and the elements 2 and 3 can be therefore made to describe any circle, arc or portion of a circle having as its center the clamping joint, and this without releasing the clamping pressure. Thus the elements 2 or 3 may be moved to any desired position, vertically or horizontally, by a slight push or pull and these elements will remain in their position until moved again as the clamping pressure does not need to be released to accomplish these movements. Further the elements 2 and 3 may be moved backward or forward to shorten or lengthen them by releasing the clamping pressure slightly, or if one or both of the elements 2 or 3 are supported, the clamping joint itself may be moved into any desired position with relation to these elements. I thus secure a joint having all the gripping or clamping power of a nut and bolt when tightened and has a greater flexibility than a ball joint with none of the disadvantages of the ball joint. As before stated, this joint is adaptable to a large variety of uses needless to state at length.

In Figs. 1, 2 and 3 I have for illustration shown one of the uses of this joint and have shown the joint in connection with an electric light bracket or support. The elements 2 and 3 in Fig. 1 constitute rods inserted through the adjustable clamping joint illustrated in Fig. 4 and adjustable through this joint and adjustable into angular relation to each other in a manner heretofore described. The rods are connected to each other by the joint A and not only may the rod 3 be adjusted with relation to this joint A, but the joint A may be adjusted with relation to the rod 2 longitudinally therealong.

The rod 3 is shown as supporting an electric lamp and hood designated 20$^a$, and the rod 2 is shown as extending through a clamping joint B which has exactly the same form as the joint A and as the joint shown in Fig. 4. In this case, however, a vertical rod 3$^a$ is disposed upon a bracket 21 and the clamping joint B may be rotated upon this rod 3$^a$ as upon an axis or may be elevated or depressed upon this rod to any extent required. The rod 2 may be rotated into angular relation to the rod 3$^a$ in exactly the same manner as the rod 2 may be angularly adjusted relative to the rod 3. It will thus be seen that the joint B and therefore the rods 2 and 3 may be vertically adjusted upon the rod 3$^a$ or lowered or may be rotated upon said rod 3$^a$. The rod 2 may be angularly adjusted relative to the clamping joint B and the rod 3$^a$. The joint A may be shifted longitudinally upon the rod 2, and the rod 3 may be angularly rotated and adjusted relative to the rod 2 or be shifted through the clamping joint A or rotated with relation thereto around its own axis.

In Fig. 2 exactly the same construction is shown as in Fig. 1, except in this case a standard 3$^b$ is illustrated provided with a clamp 22 at one end whereby it may be clamped to a table or like support. Vertically shiftable upon this standard 3$^b$ is the joint C which is exactly the same in construction as the joint B and the clamping joint shown in Fig. 4. The rod 2 passes through the joint C and is adjustable therein in the same manner as heretofore described, and shiftably mounted upon this rod 2 is the clamping joint A which is the same as that heretofore described and which adjustably supports the rod 3 carrying the electric light 20. The dotted lines in this view show various positions to which the rods 2 and 3 may be adjusted relative to the standard 3$^b$ and to each other and a number of positions at which the lamp may be held.

Fig. 3 is an enlarged view of the construction shown in Fig. 2 and therefore requires no separate description.

It is obvious that this clamping joint may be used for clamping and holding in adjusted positions rods or like elements for a variety of purposes and it is also obvious that a plurality of the clamping joints may be mounted upon either one or both of the rods 2 and 3 in turn supporting other rods or elements and that thus the device is very well adapted for supporting chemical apparatus such as test tubes, pipes, retorts, etc.

While I have illustrated what I believe to be the best form of my device, and have illustrated one of the applications thereof, I wish it distinctly understood that it may be modified in many ways without departing from the spirit of the invention, and as before stated may be applied to other uses than that shown.

While I have shown the thimble 4 and the member 7 as cylindrical, and have also shown the bolt 11 as cylindrical, I wish it distinctly understood that these members may be many-sided in cross section, without in any way affecting their operation, and that it is entirely within the purview of my invention to form these members square, triangular, or circular in cross section, as may be deemed best.

What I claim is:

1. A flexible joint of the character described comprising two pairs of coacting clamping members, a connecting member rotatively engaging one of the clamping members of one pair and both of the clamping members of the other pair, said connecting member forming a common axis for the relative rotation of both of said pairs of members with relation to each other, and means on said connecting member whereby both pairs of clamping members may be simultaneously shifted into or out of clamping position.

2. A flexible joint of the character described including two pairs of coacting clamping members, a connecting bolt passing through both pairs of clamping members and forming a common axis upon which both pairs of clamping members may turn relative to each other, and a nut engaging said connecting bolt, said nut bearing against one member of one pair of said clamping members to shift it and said bolt also engaging one member of the other pair of clamping members to also shift it when the nut is turned.

3. A flexible joint of the character described including two pairs of clamping members, one of the members of one pair being longitudinally shiftable relative to the other, a bolt having swiveled engagement with one of said clamping members, a clamping member through which said bolt passes and bearing against the other of said first named pair of clamping members, a clamping member coacting with the third named clamping member and through which the bolt passes, and a nut engaging said bolt and bearing against the last named clamping member whereby when the nut is turned up it will force the clamping members of each pair into clamping engagement with each other.

4. A joint of the character described including an outer member perforated for the passage of a supported element, an inner member also perforated for the passage of said element, opposed coacting clamping jaws rotatable with relation to the first named members and connected thereto, said clamping jaws being adapted to receive an element to be supported between them, and means for simultaneously shifting the first two members into or out of a position of eccentricity and relatively shifting the jaws toward or from each other to thereby simultaneously clamp or unclamp both of said supported elements.

5. A flexible joint of the character described, including an outer member having oppositely disposed perforations for the passage of an element to be clamped, an inner member having sliding engagement with the outer member and formed with oppositely disposed perforations for the passage of said element, said inner clamping member having an inwardly directed flange at its outer end, a clamping bolt having a head rotatively engaging the inner side face of said flange, said bolt being cylindrical for a portion of its length and being transversely perforated for the passage of a supported element, a clamping member having the form of an annulus and through which the bolt passes, said clamping member bearing against the end face of the outer first named member and being formed with a seat for the passage of the supported element, a coacting annular clamping member through which said bolt passes and also formed with a seat confronting the seat on the last named clamping member, and a nut engaging the threaded end of the bolt and when turned home engaging the last named clamping member to thereby force the two annular clamping members toward each other and shift the second named inner clamping member out of concentricity with the first named outer clamping member to thereby clamp the joint simultaneously both upon said supported members.

6. A joint of the character described including an outer member perforated for the passage of a supported element, an inner member sliding within the outer member and also correspondingly perforated for the passage of said element, a bolt having a swiveled engagement with the inner member, and a nut engaging said bolt and operatively engaging against the adjacent end of the outer clamping member whereby, when the nut is turned, to draw the bolt and the inner clamping member longitudinally with relation to the outer clamping member.

7. The combination with a pair of rods, of clamping devices, one for each rod, said clamping devices being engaged with each other for rotation on an axis intersecting said rods, and means for increasing or decreasing frictional engagement between said clamping devices.

8. The combination with a pair of rods, of a pair of clamping devices one for each rod, a bolt having swiveled engagement with one of said clamping devices and operatively engaged with the other clamping device, the bolt being perforated for the passage of one of said rods, and means for shifting said bolt relative to the clamping devices to thereby force the clamping devices toward each other and into clamping engagement with said rods.

9. The combination with a pair of rods, of a hollow member having oppositely disposed perforations through which one of said rods passes, a tubular member inclosed within the hollow member and longitudinally slidable therein and having oppositely disposed perforations through which the said rod passes, a bolt having swiveled engagement with said inner tubular member and extending out beyond the same and perforated for the passage of the other rod, annular clamping members surrounding said bolt and having confronting seats for the reception of the last named rod, and a nut screw threaded on the bolt and when turned up bearing against one of said last named clamping members to thereby force the last named clamping members toward each other and into frictional engagement with the first named clamping member and simultaneously shift the inner tubular member to carry its perforations out of concentricity with the perforations of the outer member.

10. A flexible joint of the character described including two pairs of co-acting clamping members, a connecting bolt passing through both pairs of clamping members and forming a common axis upon which both pairs of clamping members may be turned relative to each other, and a nut engaging said connecting bolt, said nut bearing against one member of one pair of said clamping members to shift it, and said nut also engaging one member of the other pair of clamping members to shift it when the nut is turned, each pair of clamping members being formed with seats for the passage of a supported element, and the nut being provided with an elongated aperture through which the corresponding supported element passes.

In testimony whereof I affix my signature in presence of two witnesses.

CHARLES P. KLORER. [L. S.]

Witnesses:
ROBERT C. HOERLE,
F. P. MARTIN.